US012563429B2

(12) United States Patent
Ashour et al.

(10) Patent No.: US 12,563,429 B2
(45) Date of Patent: Feb. 24, 2026

(54) MULTIPLE ACCESS POINT (AP) ASSOCIATION

(71) Applicant: QUALCOMM Incorporated, San Diego, CA (US)

(72) Inventors: Mahmoud Ashour, San Diego, CA (US); Kapil Gulati, Belle Mead, NJ (US); Himaja Kesavareddigari, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/348,325

(22) Filed: Jul. 6, 2023

(65) Prior Publication Data

US 2025/0016588 A1     Jan. 9, 2025

(51) Int. Cl.
| | |
|---|---|
| *H04W 24/08* | (2009.01) |
| *H04B 7/08* | (2006.01) |
| *H04B 17/318* | (2015.01) |
| *H04W 48/08* | (2009.01) |

(52) U.S. Cl.
CPC ............ *H04W 24/08* (2013.01); *H04B 7/088* (2013.01); *H04B 17/318* (2015.01); *H04W 48/08* (2013.01)

(58) Field of Classification Search
CPC ............................... H04L 12/28; H04L 12/50
USPC ................................. 370/329, 401, 402, 403
See application file for complete search history.

(56) References Cited

U.S. PATENT DOCUMENTS

| | | | |
|---|---|---|---|
| 2016/0157218 A1* | 6/2016 | Nam .................... | H04B 7/0639 |
| | | | 370/329 |
| 2020/0252838 A1 | 8/2020 | Akdeniz et al. | |
| 2021/0281305 A1 | 9/2021 | Grant et al. | |
| 2021/0351885 A1 | 11/2021 | Chavva et al. | |
| 2022/0400390 A1 | 12/2022 | Zhu et al. | |
| 2023/0170976 A1 | 6/2023 | Metwaly Saad et al. | |
| 2023/0397029 A1* | 12/2023 | Bai ........................ | H04B 7/063 |
| 2024/0372600 A1* | 11/2024 | Schreck ............... | H04B 7/0456 |

OTHER PUBLICATIONS

Partial International Search Report—PCT/US2024/035133—ISA/EPO—Oct. 21, 2024.
International Search Report and Written Opinion—PCT/US2024/035133—ISA/EPO—Feb. 5, 2025.

* cited by examiner

*Primary Examiner* — Dang T Ton
(74) *Attorney, Agent, or Firm* — ArentFox Schiff LLP

(57) ABSTRACT

Aspects of the disclosure are directed to method of selecting receive beams using a neural network (e.g., via a reinforcement learning process). In some examples, a user equipment (UE) may select one or more receive beams for receiving synchronization signal blocks (SSBs) of a first synchronization signal burst set (SSBS). In some examples, the UE may measure a power of a first SSB of the first SSBS received via a first receive beam of the one or more receive beams. In some examples, the UE may store, in a local storage, the measured power of the first SSB and at least one parameter associated with receiving the first SSB.

28 Claims, 13 Drawing Sheets

Core Network

420

Backhaul link

Service Management and Orchestration (SMO) Framework

Non-Real Time RAN Intelligent Controller (RIC)

415

405

O1

O1

E2

A1

Near-Real Time RAN Intelligent Controller (RIC)

425

O-eNB

411

O2

O-Cloud

490

E2

CU

410

E2

Midhaul link

DU

430

Midhaul link

Fronthaul link

DU

430

RU

440

RU

440

RU

440

Access link

UE

104

UE

104

UE

104

UE

104

UE

104

400

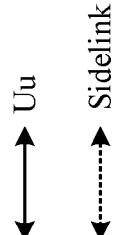
Uu
Sidelink
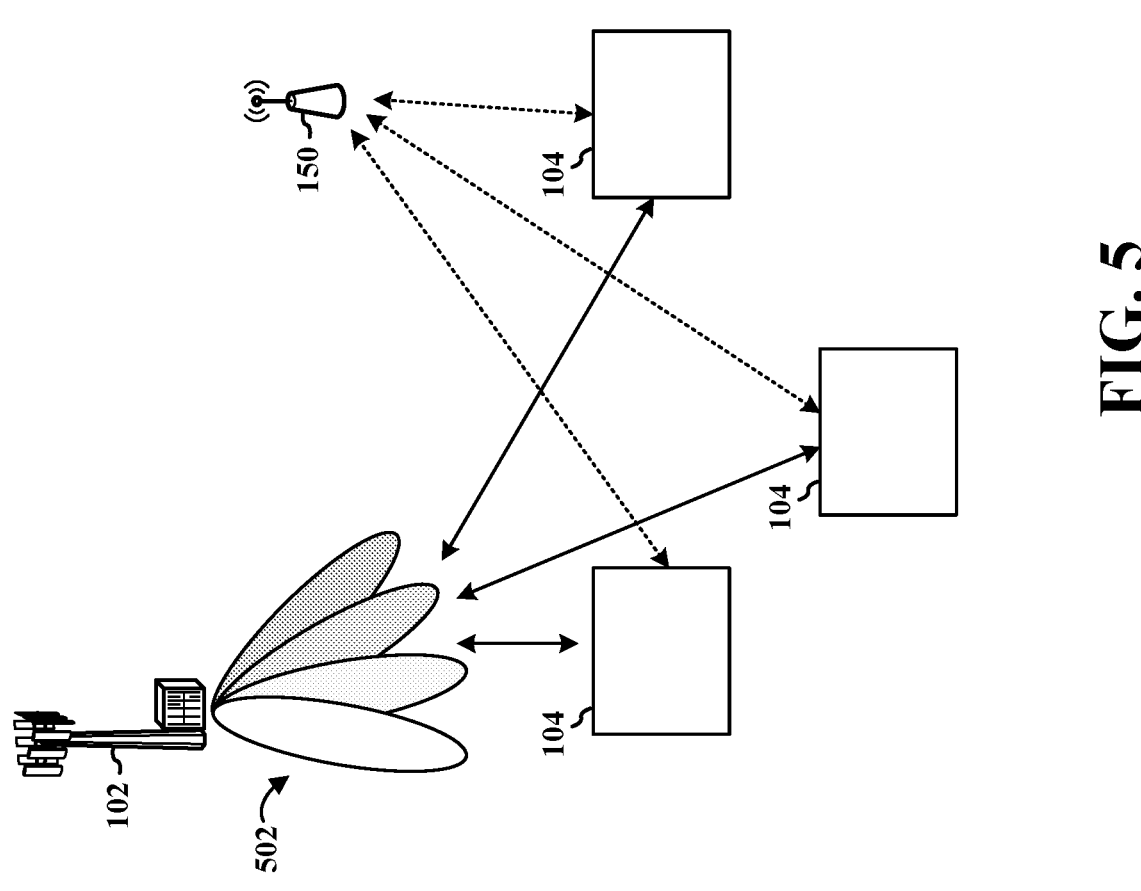
150
104
104
104
102
502
500
FIG. 5

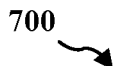
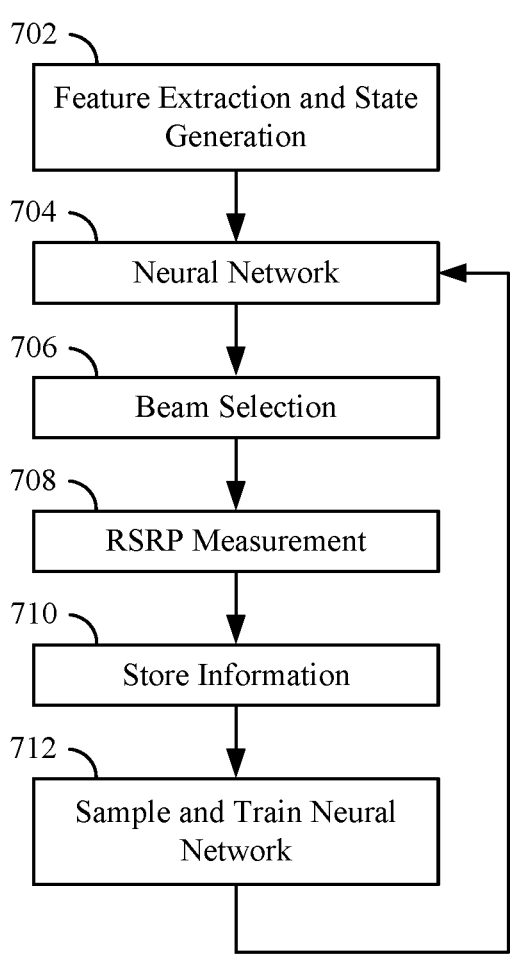
FIG. 7

Figure 9:
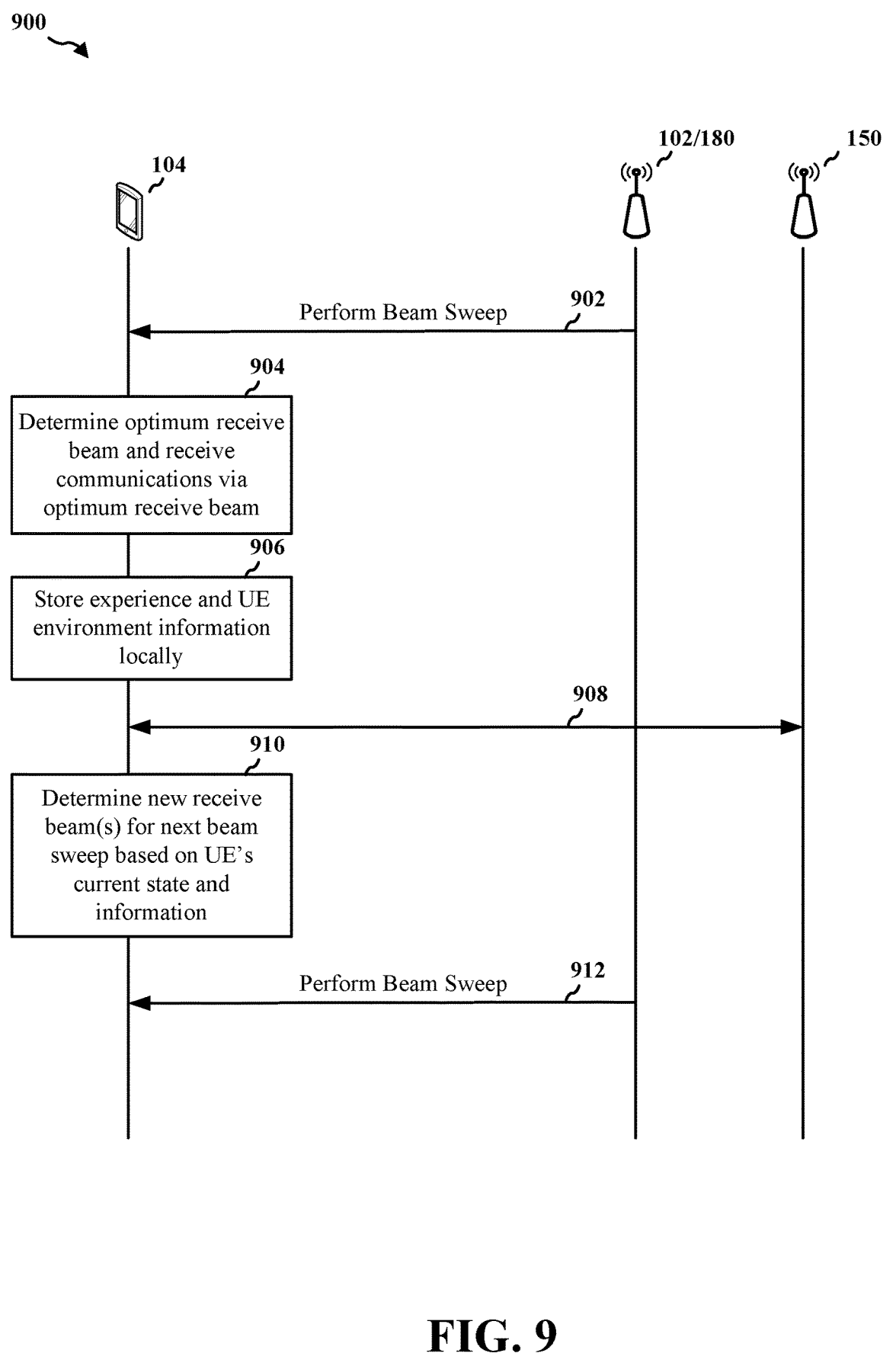

900

104            102/180     150

Perform Beam Sweep    902

904

| Determine optimum receive beam and receive communications via optimum receive beam |
|---|

906

| Store experience and UE environment information locally |
|---|

908

910

| Determine new receive beam(s) for next beam sweep based on UE's current state and information |
|---|

Perform Beam Sweep    912

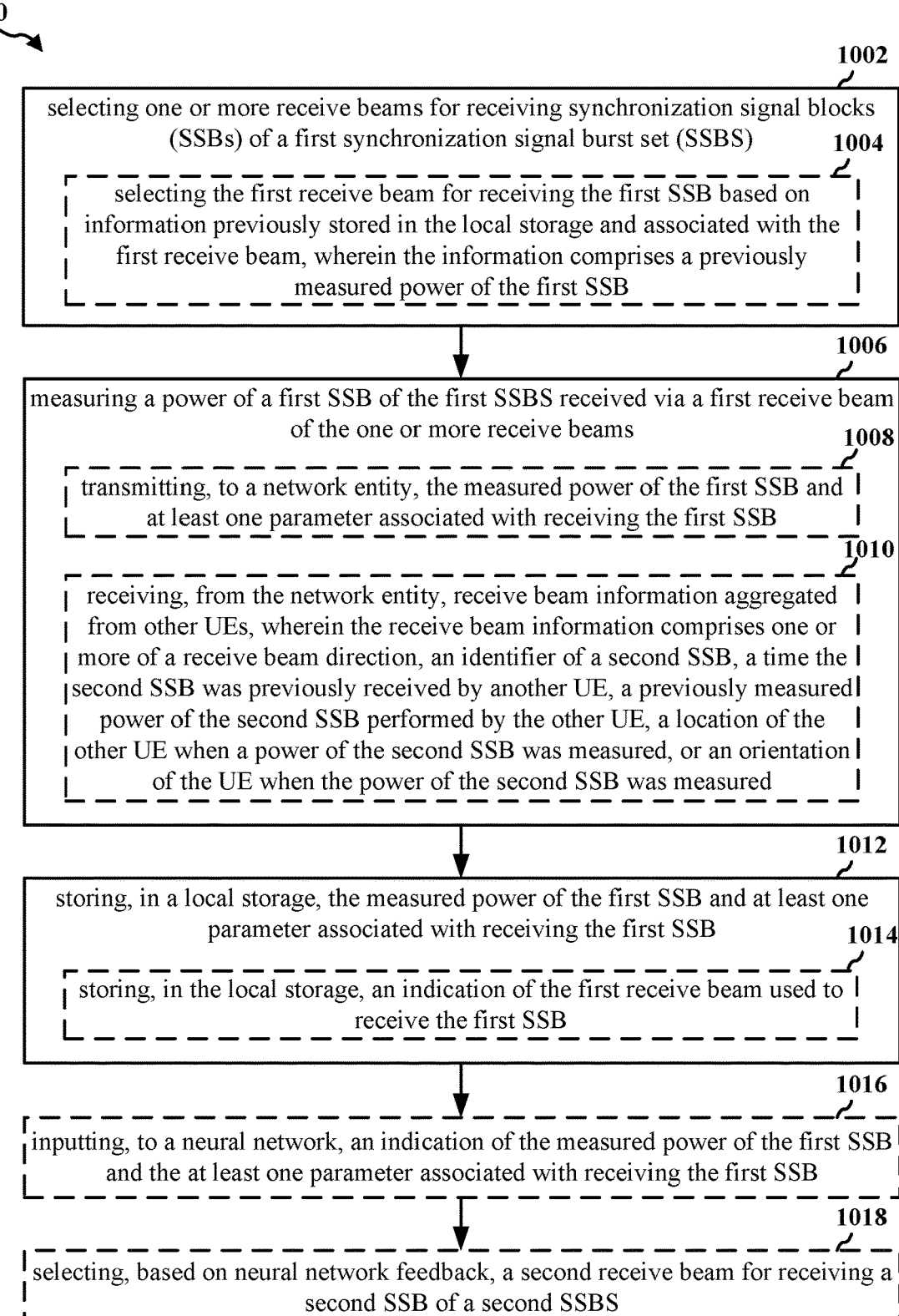

1002 selecting one or more receive beams for receiving synchronization signal blocks (SSBs) of a first synchronization signal burst set (SSBS)    1004 selecting the first receive beam for receiving the first SSB based on information previously stored in the local storage and associated with the first receive beam, wherein the information comprises a previously measured power of the first SSB

1006 measuring a power of a first SSB of the first SSBS received via a first receive beam of the one or more receive beams    1008 transmitting, to a network entity, the measured power of the first SSB and at least one parameter associated with receiving the first SSB

1010 receiving, from the network entity, receive beam information aggregated from other UEs, wherein the receive beam information comprises one or more of a receive beam direction, an identifier of a second SSB, a time the second SSB was previously received by another UE, a previously measured power of the second SSB performed by the other UE, a location of the other UE when a power of the second SSB was measured, or an orientation of the UE when the power of the second SSB was measured

1012 storing, in a local storage, the measured power of the first SSB and at least one parameter associated with receiving the first SSB    1014 storing, in the local storage, an indication of the first receive beam used to receive the first SSB

1016 inputting, to a neural network, an indication of the measured power of the first SSB and the at least one parameter associated with receiving the first SSB

1018 selecting, based on neural network feedback, a second receive beam for receiving a second SSB of a second SSBS

1202 receiving, from a first user equipment (UE) of a plurality of UEs, a first receive beam data identifying first receive beam and a power measurement of a synchronization signal block (SSB) received via the first receive beam

1204 transmitting, to the first UE, a second receive beam data identifying a second receive beam and a second power measurement, wherein the second receive beam data is a portion of aggregated beam data received by the network entity from the plurality of UEs and stored at the network entity

FIG. 12

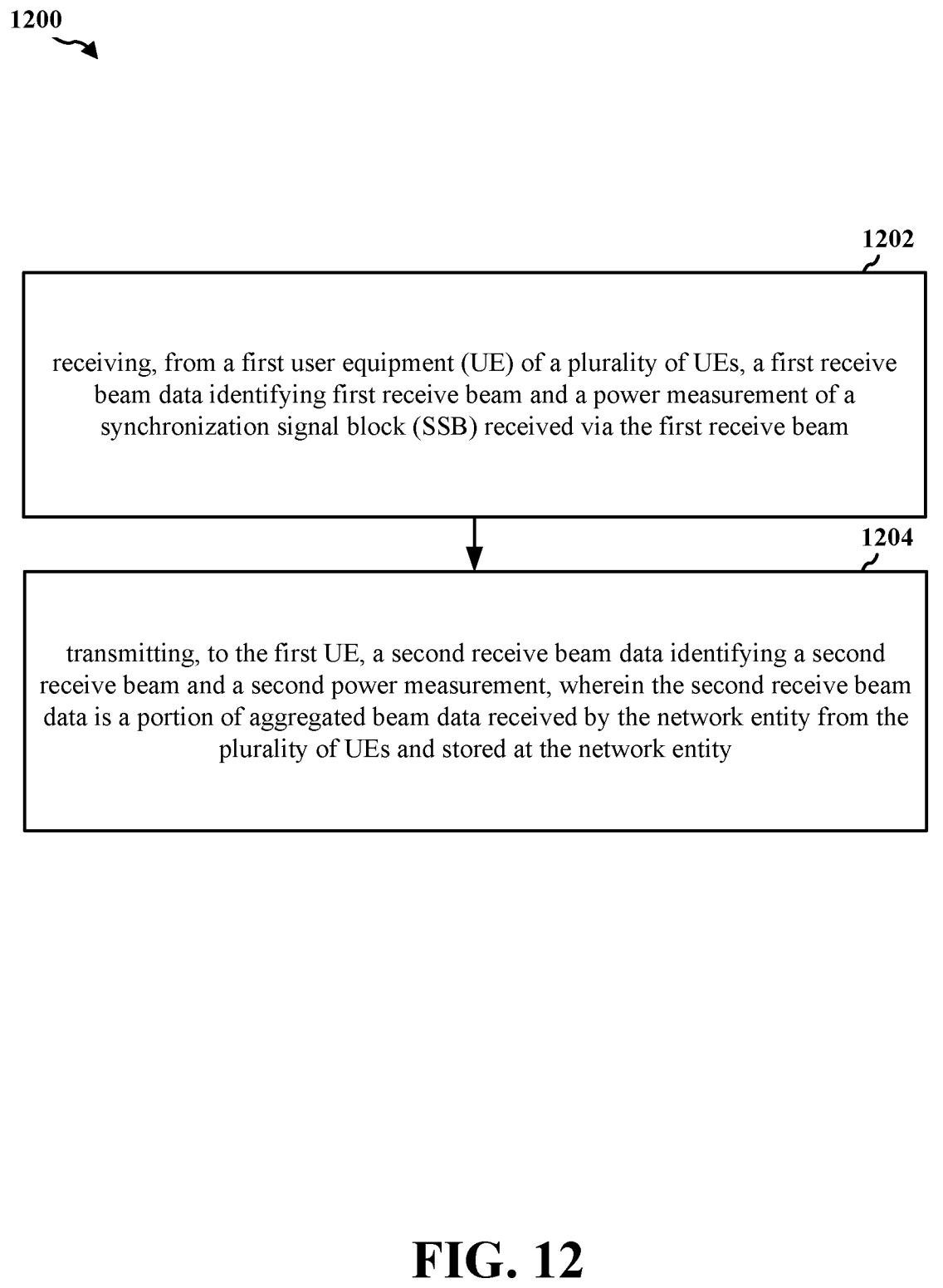

MULTIPLE ACCESS POINT (AP) ASSOCIATION

BACKGROUND

Technical Field

The present disclosure generally relates to communication systems, and more particularly, to association between a wireless device and multiple access points (APs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of beam management at a user equipment (UE), including: selecting one or more receive beams for receiving synchronization signal blocks (SSBs) of a first synchronization signal burst set (SSBS); measuring a power of a first SSB of the first SSBS received via a first receive beam of the one or more receive beams; and storing, in a local storage, the measured power of the first SSB and at least one parameter associated with receiving the first SSB.

In some aspects, the techniques described herein relate to a method of beam management at a network entity, including: receiving, from a first user equipment (UE) of a plurality of UEs, a first receive beam data identifying first receive beam and a power measurement of a synchronization signal block (SSB) received via the first receive beam; and transmitting, to the first UE, a second receive beam data identifying a second receive beam and a second power measurement, wherein the second receive beam data is a portion of aggregated beam data received by the network entity from the plurality of UEs and stored at the network entity.

In some aspects, the techniques described herein relate to an apparatus for wireless communication at a user equipment (UE), including: one or more memories, individually or in combination, having instructions; and one or more processors, individually or in combination, configured to execute the instructions and cause the apparatus to: measure a power of a first SSB of the first SSBS received via a first receive beam of the one or more receive beams; and store, in a local storage, the measured power of the first SSB and at least one parameter associated with receiving the first SSB.

In some aspects, the techniques described herein relate to an apparatus for wireless communication at a network entity, including: one or more memories, individually or in combination, having instructions; and one or more processors, individually or in combination, configured to execute the instructions and cause the apparatus to: receive, from a first user equipment (UE) of a plurality of UEs, a first receive beam data identifying first receive beam and a power measurement of a synchronization signal block (SSB) received via the first receive beam; and transmit, to the first UE, a second receive beam data identifying a second receive beam and a second power measurement, wherein the second receive beam data is a portion of aggregated beam data received by the network entity from the plurality of UEs and stored at the network entity.

In some aspects, the techniques described herein relate to beam management at a user equipment (UE). In some examples, the UE includes means for selecting one or more receive beams for receiving synchronization signal blocks (SSBs) of a first synchronization signal burst set (SSBS). In some examples, the UE includes means for measuring a power of a first SSB of the first SSBS received via a first receive beam of the one or more receive beams. In some examples, the UE includes means for storing, in a local storage, the measured power of the first SSB and at least one parameter associated with receiving the first SSB.

In some aspects, the techniques described herein relate to beam management at a network entity. In some examples, the network entity includes means for receiving, from a first user equipment (UE) of a plurality of UEs, a first receive beam data identifying first receive beam and a power measurement of a synchronization signal block (SSB) received via the first receive beam. In some examples, the network entity includes means for transmitting, to the first UE, a second receive beam data identifying a second receive beam and a second power measurement, wherein the second receive beam data is a portion of aggregated beam data received by the network entity from the plurality of UEs and stored at the network entity.

In some aspects, the techniques described herein relate to a non-transitory, computer-readable medium comprising computer executable code, the code when executed by one or more processors causes the one or more processors to, individually or in combination: select one or more receive beams for receiving synchronization signal blocks (SSBs) of a first synchronization signal burst set (SSBS); measure a power of a first SSB of the first SSBS received via a first receive beam of the one or more receive beams; and store, in a local storage, the measured power of the first SSB and at least one parameter associated with receiving the first SSB.

In some aspects, the techniques described herein relate to a non-transitory, computer-readable medium comprising computer executable code, the code when executed by one or more processors causes the one or more processors to, individually or in combination: receive, from a first user equipment (UE) of a plurality of UEs, a first receive beam data identifying first receive beam and a power measurement of a synchronization signal block (SSB) received via the first receive beam; and transmit, to the first UE, a second receive beam data identifying a second receive beam and a second power measurement, wherein the second receive beam data is a portion of aggregated beam data received by the network entity from the plurality of UEs and stored at the network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their

BRIEF DESCRIPTION OF THE DRAWINGS

FIG. 5 is a diagram illustrating an example communication network including a base station, multiple UEs and a network entity.

FIG. 7 is a flow chart illustrating an example process for receive beam selection performed by a UE.

FIG. 9 is a call-flow diagram illustrating example communications between a UE, and a base station and network entity.

FIG. 10 is a flowchart of a method of wireless communication.

FIG. 12 is a flowchart of a method of wireless communication.

DETAILED DESCRIPTION

Figure 1:
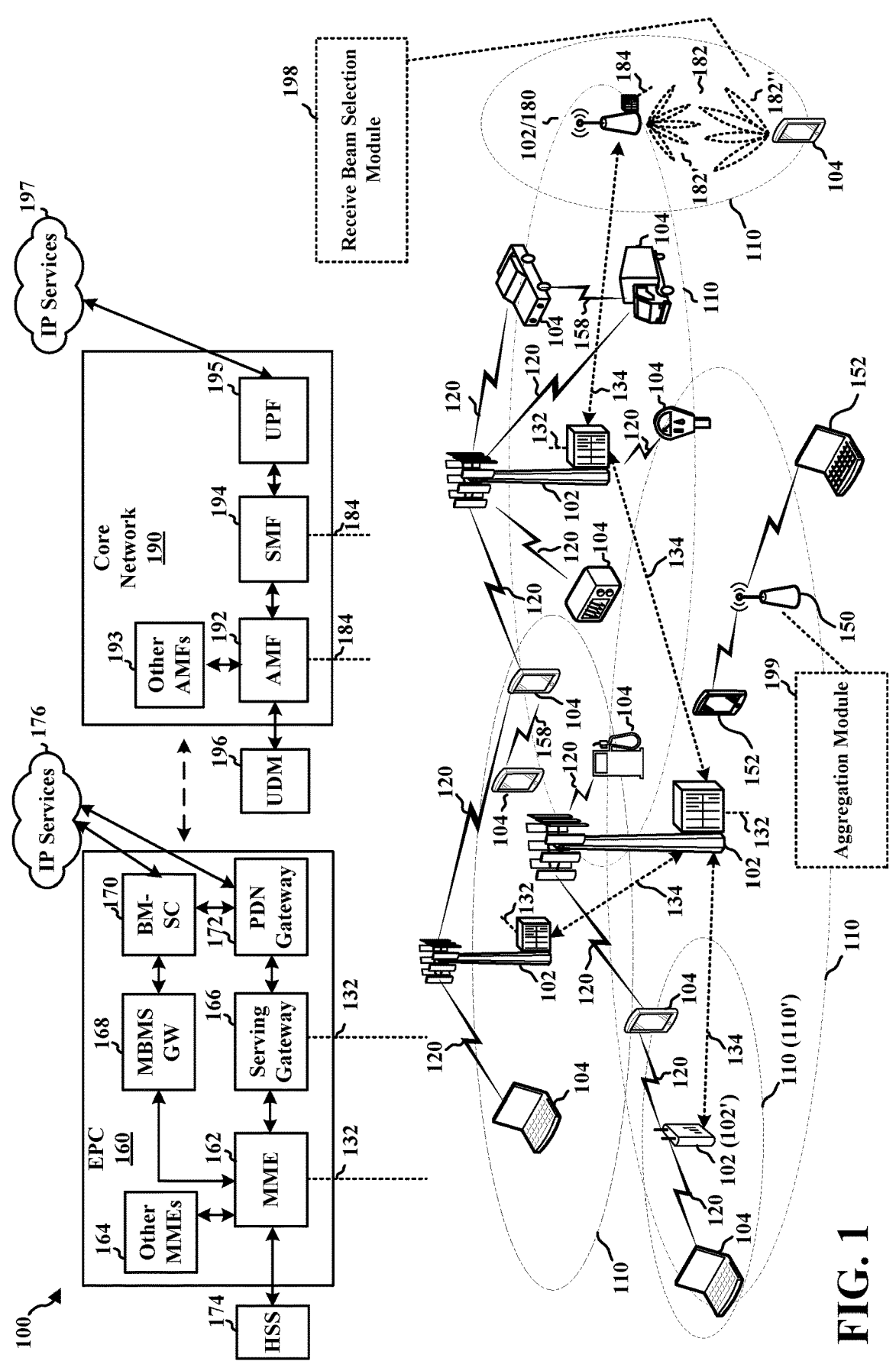
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A beam management process between a user equipment (UE) and a network entity typically relies on UE beam measurements and reporting of certain reference signals (RSs). For example, the network entity may transmit a plurality of synchronization signal blocks (SSBs), with each SSB being transmitted over a particular transmit beam. The UE may select one or more receive beams to receive and measure the SSBs. A UE beam management policy may relate to a UE process of generating a schedule (e.g., a list) of UE receive beams used for receiving the SSBs. However, the UE may not always select an optimum beam for receiving an SSB.

Thus, aspects of the disclosure are directed to collaborative learning of UE beam management policies based on using crowd sourced information (e.g., information provided by other UEs in the area). Other aspects are directed to techniques of UE self-learning by storing certain data associated with the receive beams used, the SSBs received, power measurements, UE environment, etc.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (cNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a network entity 150 (e.g., a Wi-Fi access point (AP) in communication with Wi-Fi stations (STAs) 152 and/or UEs 104). When communicating in an unlicensed frequency spectrum, the STAs 152/network entity 150 may perform a clear channel assessment (CCA) prior to communicating in order to determine whether the channel is available. In some examples, the network entity 150 may be configured as an edge server, and may be external to the wireless communication system (e.g., has little or no communication with a base station or other network entity, but may maintain communications with UEs 104 and/or STAs 152 within range).

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the network entity 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless node may comprise a UE, a base station, or a network entity of the base station.

Referring again to FIG. 1, the UE 104 may include a receive beam selection module 198 configured to perform one or more operations described herein.

The network entity 150 may include an aggregation module 199 configured to perform one or more operations described herein.

Figures 2A, 2B, 2C, 2D:
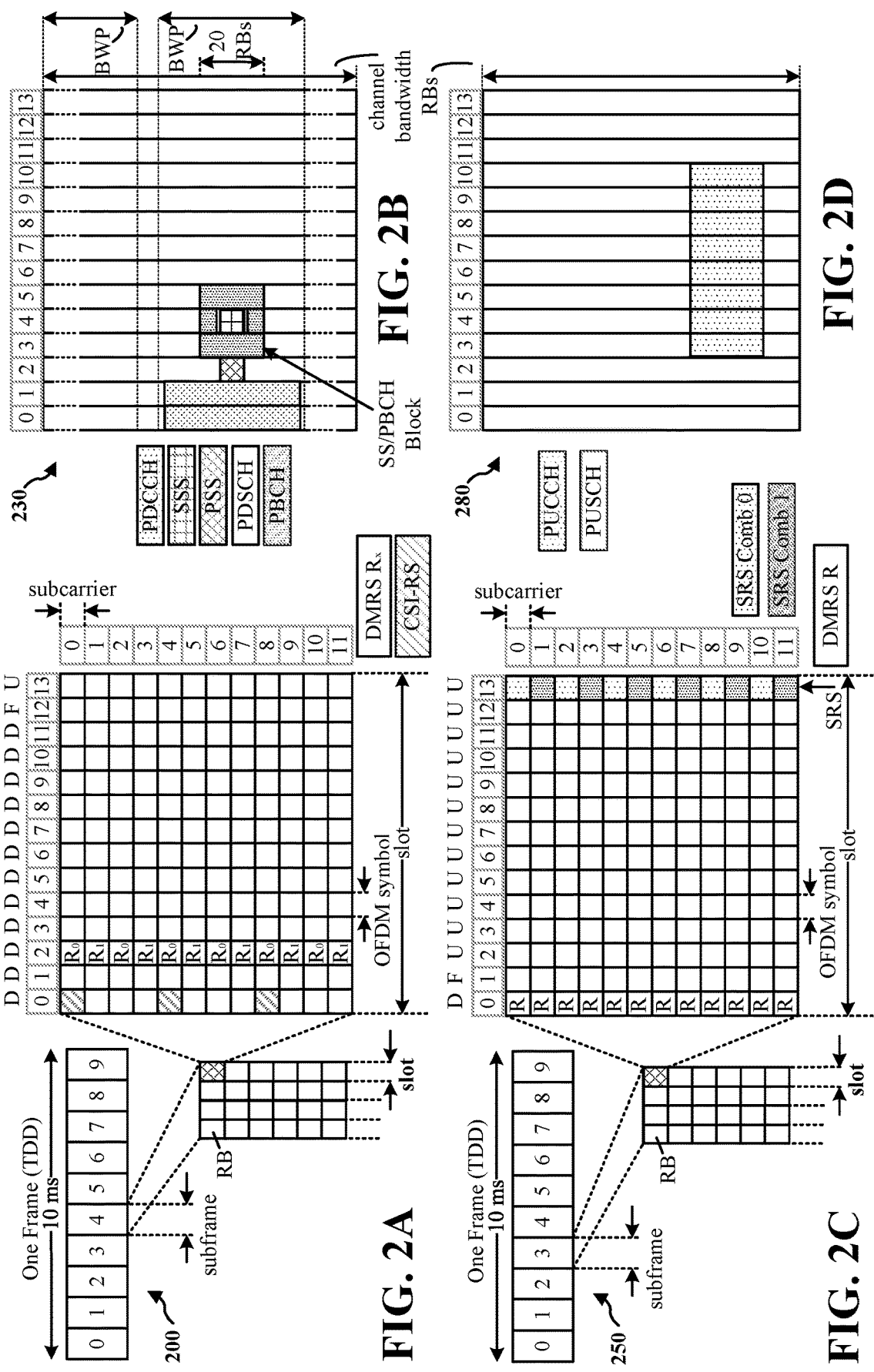
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R$_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
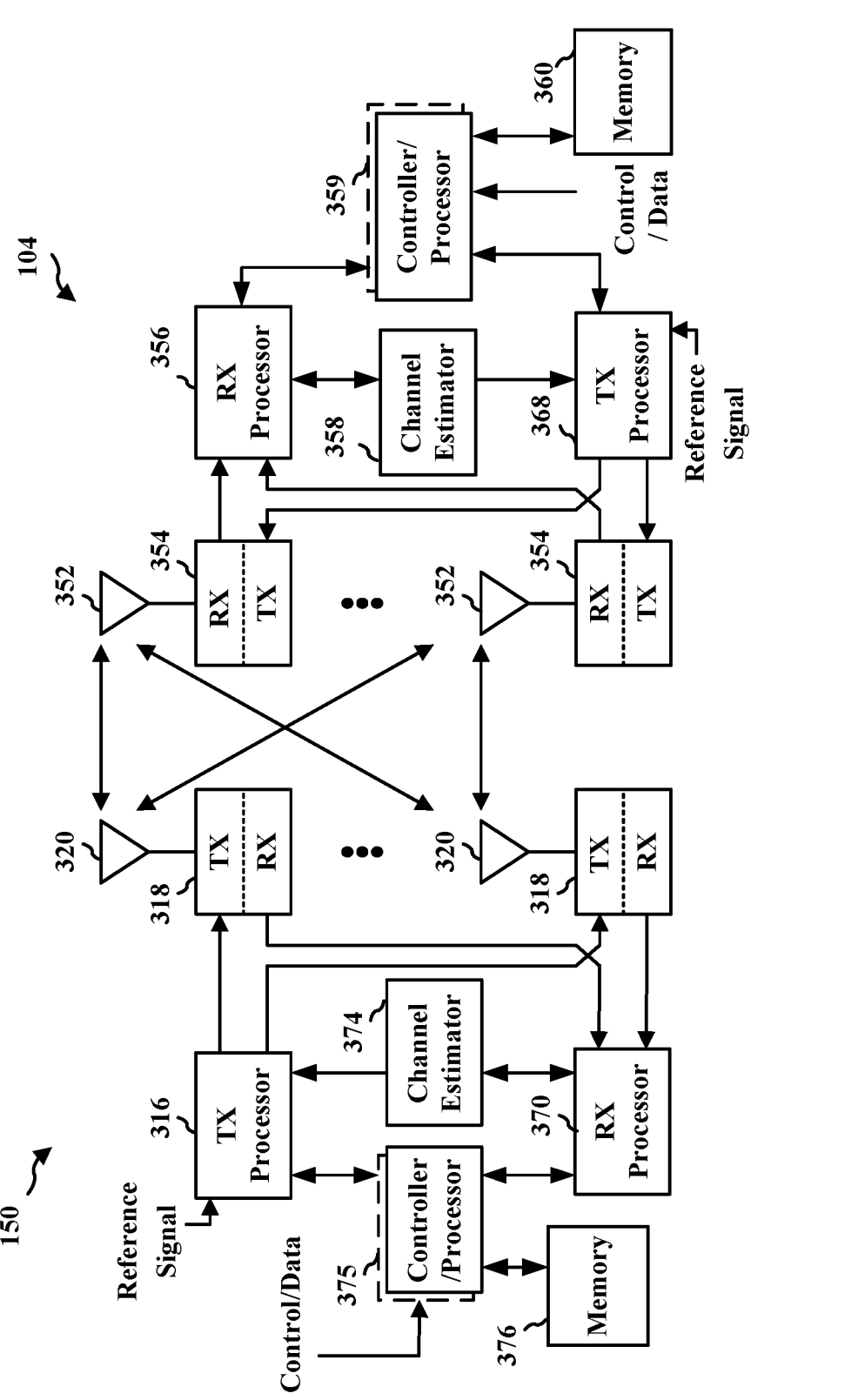
FIG. 3 is a diagram illustrating an example of a base station and user equipment (UE) in an access network.

FIG. 3 is a block diagram of a network entity 150 (e.g., an edge server, AP, or another UE) in communication with a UE 104 in an access network. In the DL, IP packets from the EPC 160 may be provided to one or more controller/processors 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network entity 150. These soft decisions may be based on channel estimates computed by the channel estimator 358. The soft decisions are then decoded and deinterleaved to recover the data and control signals that were originally transmitted by the network entity 150 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network entity 150, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network entity 150 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the network entity 150 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the receive beam selection module 198 of FIG. 1. For example, the controller/ processor 359 may provide the means for selecting one or more receive beams for receiving synchronization signal blocks (SSBs) of a first synchronization signal burst set (SSBS). The controller/processor 359 may provide the means for measuring a power of a first SSB of the first SSBS received via a first receive beam of the one or more receive beams. The controller/processor 359 may provide the means for storing, in a local storage, the measured power of the first SSB and at least one parameter associated with receiving the first SSB.

At least one of the TX processor 316, the RX processor 370, and the controller/processor 375 may be configured to perform aspects in connection with the aggregation module 199 of FIG. 1. For example, the RX processor 370 may provide the means for receiving, from a first user equipment (UE) of a plurality of UEs, a first receive beam data identifying first receive beam and a power measurement of a synchronization signal block (SSB) received via the first receive beam. For example, the TX processor 316 may provide the means for transmitting, to the first UE, a second receive beam data identifying a second receive beam and a second power measurement, wherein the second receive beam data is a portion of aggregated beam data received by the network entity from the plurality of UEs and stored at the network entity.

Figure 4:
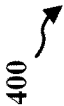
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As used herein, a network entity may correspond to a base station or to a disaggregated aspect (e.g., CU/DU/RU, etc.) of the base station.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an AI interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Examples of Beam Management Policies at a UE

FIG. 5 is a diagram illustrating an example communication network 500 including a base station 102, multiple UEs 104 and a network entity 150. As illustrated, the base station 102 is performing a beam management process with the UEs 104. The UEs 104 may be personal devices (e.g., cell phones, etc.), vehicles, etc. The UEs 104 may be configured to communicate with the network entity 150 using a sidelink communication channel and communicate with the base station 102 using a Uu or other suitable communication channel. It should be noted that although the examples described herein relate to a beam management process using SSB reference signals, a network entity and UEs may alternatively be configured to use channel state information reference signals (CSI-RSs) for beam management.

A beam management process is performed by sweeping, at the base station 102, through a plurality of downlink beams. That is, the transmitter may transmit a set of SSBs, with each SSB associated with one of a plurality of beams 502. The set of SSBs within a beam-sweep is referred to as a synchronization signal burst set (SSBS). Prior to transmission of the SSBs, each UE 104 may schedule which receive beams (e.g., from a receive-beam codebook) the UE 104 will use to measure the transmitted SSBs, where such scheduling is part of a UE beam management policy. In some examples, a UE 104 may select a single receive beam to measure the set of SSBs of an SSBS. In another example, the UE 104 may select multiple receive beams and schedule each of the multiple receive beams to receive a particular SSB from the SSBS. In other words, the UE 104 may schedule a particular receive beam for each SSB in the SSBS. In the case of analog beam forming. SSB transmissions within the different downlink beams may be done in sequence (e.g., a beam sweep).

The UEs 104 may use their corresponding scheduled receive beam(s) to receive the SSBs of an SSBS, and to measure the power of each received SSB. For example, the measured power may be defined by one or more of a reference signal received power (RSRP), a reference signal received quality (RSRQ), or a signal to interference plus noise ratio (SINR).

However, conventional UE beam management policy may not always provide a UE with an optimum receive beam for measuring SSBs. For example, the UE may select a receive beam direction that measures a lower RSRP relative to what another receive beam direction would have measured. Thus, aspects are directed to "crowd-sourcing" information so that the UE may select a receive beam that provides a highest quality SSB measurement relative to another beam direction.

However, techniques such as "crowd-sourcing" (where a UE may receive information provided by other UEs) may cause problems if the other UEs have a different manufacturer or carrier such that the other UEs are configured different relative to other UEs. In one example, different UEs may be sourced from different vendors and hence, may use different antenna panel configurations. In such an example, these configurations may result in different beam codebooks being used across multiple UEs.

Figure 6:
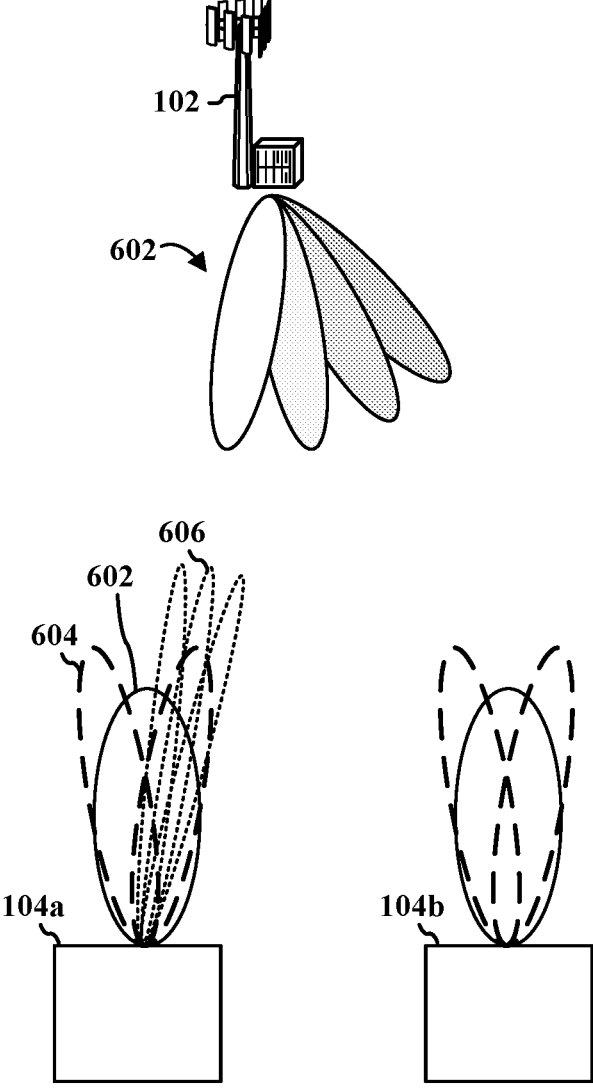
FIG. 6 is a diagram illustrating a conceptual example of different UEs configured with different receive beam codebooks.

For example, FIG. 6 is a diagram illustrating a conceptual example of different UEs configured with different receive beam codebooks. Here, a first UE 104a may be configured with a receive beam codebook having a broad beam 602 direction, multiple refined beam 604 directions within the broad beam 602 and sharing its general direction, and multiple narrower beams 606 within each refined beam 604 and sharing its general direction. In contrast, a second UE 104b may be configured such that its receive beam codebook does not include an equivalent to the narrower beams 606 of the first UE 104a. Thus, crowd-sourcing techniques may need to provide a solution whose effectivity is not reduced by different UE configurations.

Accordingly, as described below, aspects of the disclosure are directed to crowd-sourcing information and using that information in a manner that does not require use of absolute beam identifiers. As such, a first UE 104a having a different codebook relative to a second UE 104b, may still provide information that the other can use for receive beam selection.

Examples of Self-Learning Beam Management Policies

Referring back to FIG. 5, a UE 104 may be configured to perform beam management processes with the base station 102 and store the outcome of the processes on a local memory or digital storage (e.g., an experience buffer). In some examples, the outcome may include information identifying each receive beam used in the beam management process (e.g., information indicating receive beam direction and/or which receive beam of a codebook was used to receive SSBs from a particular SSBS), a power measurement at each receive beam (e.g., an RSRP measured based on an SSB received at each receive beam), information identifying the transmit beam used by the base station 102 to transmit each SSB (e.g., information identifying the SSB or beam direction) a power measurement, a time that a particular SSBS began (e.g., a time that the beam management process started) or a time that the UE performed a measurement on a particular SSB, and/or any other suitable information.

In some examples, the UE may also store UE environmental information about each instance of a beam management process. For instance, UE environmental information may include a location of the UE during a particular SSBS, an orientation of the UE, a direction of UE movement, a speed of the UE, etc.

The UE may store the outcome information and the environmental information, and base its selection of a receive beam for a next beam management process on the stored information. In some examples, the UE may train a neural network (e.g., a reinforcement learning process, described in more detail below) using the outcome and/or environmental information.

For example, an individual may drive a car along a same route, or within a same region on a regular basis. While en route, the UE may perform beam management processes with base stations 102 along that route and store information about the outcomes of the processes. Based on these outcomes, the UE may learn to select higher quality receive beams during a later trip along the same route or within the same region. Thus, the UE may relate back to its pervious experiences to determine which receive beam direction previously provided the highest quality signal to improve future communications.

Examples of Self-Learning Beam Management Policies Using Information Provided by Other UEs Still referring to FIG. 5, each UE 104 may store its outcome and/or environmental information (described above) locally and may also transmit one or more elements of that information to the network entity 150. Each UE 104 may maintain a locally stored measurement database within which a UE 104 may store the outcome and/or environmental information. The measurement database may be structured as one or more tables. For example, the may UE locally store a table for each SSB transmitted by the base station. Each table may have a row for each receive beam of the UE (e.g., each receive beam of the codebook) and each row may include previous power measurements performed on the corresponding SSB. Each row may further include other outcome and/or environmental information, such as a time each measurement was performed, a UE orientation during the measurement, a UE location, etc. Thus, the UE may maintain one or more such tables, where each table corresponds to a particular beam used by the base station to transmit an SSB.

FIG. 7 is a flow chart illustrating an example process 700 for receive beam selection performed by a UE. At a first block 702, at the time a power measurement of an SSB is to be made, the UE may perform a feature extraction to generate a "state" of the UE. Here, the UE may transform the locally stored data from the measurement database (e.g., outcome and/or environmental information) and/or information obtained from the network entity 150 (e.g., information provided by other UEs) into a vector indicative of the state of the UE. The vector may to be used as an input to a neural network to generate a receive beam recommendation.

At a second block 704, the state is input into the neural network which uses the input to make a decision on which UE receive beam or beam direction the UE should use to measure an SSB transmitted by the base station. For example, the SSB may be transmitted as part of a beam management process, and the neural network may be used by the UE to determine which receive beams to use for each SSB of an SSBS. In some examples, the neural network may provide the UE with a recommended beam direction or a recommended beam transition instead of identifying an absolute beam.

At a third block 706, the UE may select and schedule one or more receive beams to receive and measure SSBs transmitted by the base station. The measurement may include one or more of an RSRP, an RSRQ, or an SINR measurement of each SSB.

At a fourth block 708, the UE may measure each received SSB of an SSBS. The measurement may include one or more of an RSRP, an RSRQ, or an SINR measurement of each SSB.

At a fifth block 710, the UE may store the outcome and/or environmental information associated with the SSB measurements in the measurement database. For example, the UE may update each table of the measurement database corresponding to an SSB received by the UE, and update the tables by adding information corresponding to each row associated with a receive beam used by the UE.

At a sixth block 712, the UE may use the updated measurement database to train the neural network by generating a vector based on the stored information.

Referring back to FIG. 5, the multiple UEs may also transmit information from their respective measurement databases to the network entity 150. The network entity may receive information from multiple UEs, and aggregate and store the information. Thus, the UEs 104 that are within range of the network entity 150 may transmit their outcome and/or environmental information via, for example, a sidelink communication link.

In some examples, using the sidelink communication link, the UEs 104 may request information from the network entity 150 in order to train their corresponding neural networks. Such information may be combined with locally stored UE information and input as a vector to the neural network. As noted above, the UEs 104 may be manufactured by different vendors and hence, may include different antenna panel configurations and different beam codebooks. Moreover, the UEs may be moving at different speeds relative to each other, and thus, their respective wireless channel conditions may be different, affecting the quality of RS measurements at each UE. For example, a rapidly moving UE may use a first receive beam to receive an SSB, and a relatively slower UE may use the same first receive beam to receive the same SSB. However, the channel conditions of the rapidly moving UE may be less efficient compared to the slow moving UE, thus relative power measurements may be different for both UEs despite both UEs using similar receive beams.

Accordingly, in some examples, the UEs 104 may store the power measurements as differential values instead of absolute values. Thus, for example, if the first UE transitioned from an RSRP value of −60 to −65 dBm, and the second UE transitioned from −70 to −75 dBm, then the differential is the same in both UEs (e.g., differential value is 5 dBm) even though −70 to −75 is lower quality than the RSRP measured by the first UE. As such, the power measurements transmitted to the network entity 150 may not be, for example, absolute RSRP values. Accordingly, information provided by the network entity 150 to the UEs may include differential power measurements that receiving UEs may use to train their corresponding neural networks.

Moreover, to the extent different UEs may communicate using different receive beam codebooks, the neural network used by the UEs to determine a receive beam may provide a corresponding UE with directional or transitional information instead of an identity of a recommended beam. For example, referring to FIG. 6, the first UE 104a may have a codebook that includes multiple narrower beams 606 that a codebook of the second UE 104b does not include.

Figure 8:
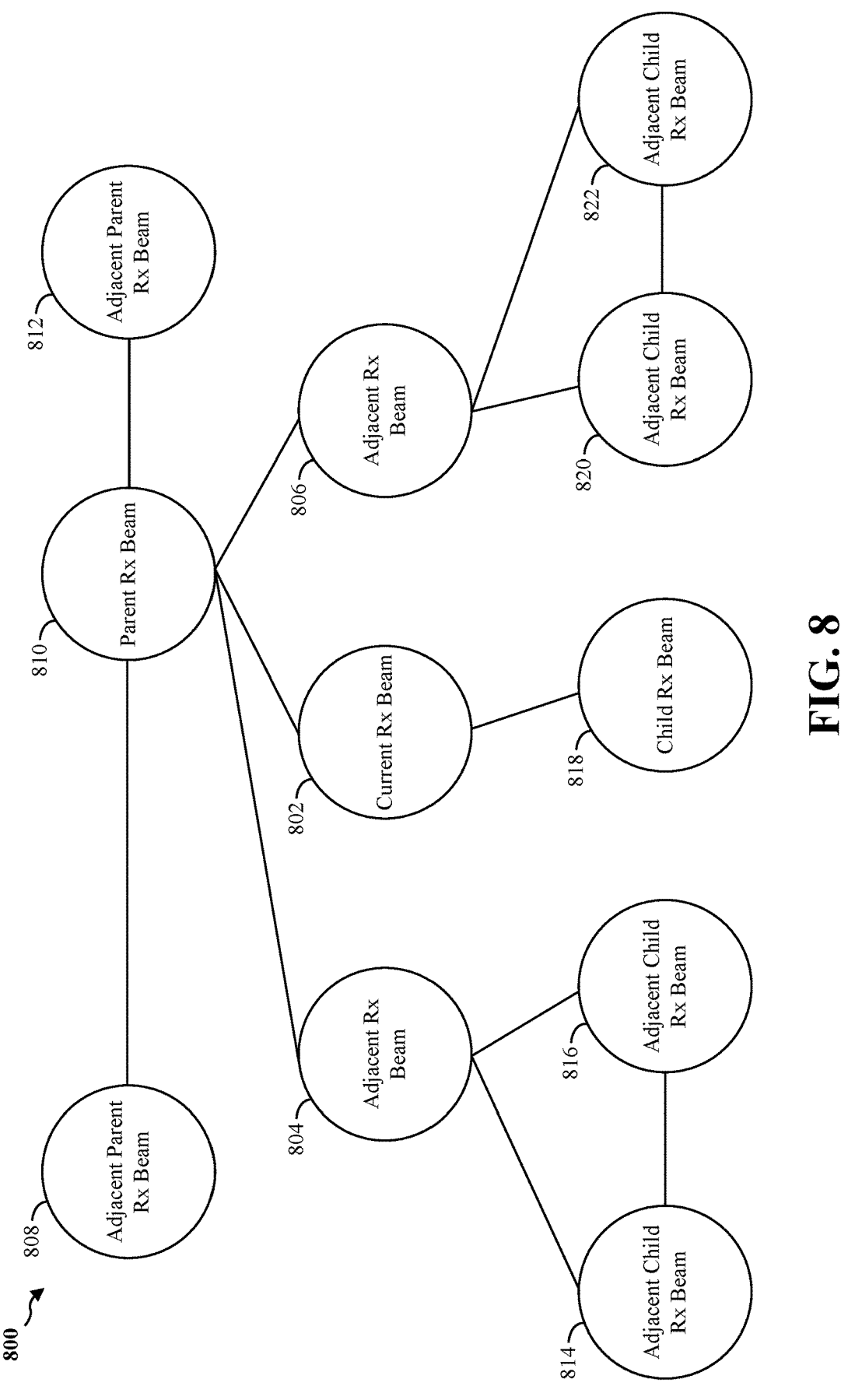
FIG. 8 is a diagram conceptually illustrating an example of a UE beam management decision process.

FIG. 8 is a diagram conceptually illustrating an example of a UE beam management decision process 800 via a neural network. Here, instead of proving the UE with a recommendation that identifies a particular beam, the neural network may recommend a beam transition for a particular time, location, orientation, speed, etc. of the UE. As illustrated, the UE may be using a current receive beam 802 to receive SSBs from the base station. However, based on one or more of outcome and environmental information stored locally at an experience buffer and information received from the network entity 150, the neural network may recommend a transition from the current receive beam 802 to one or more of an adjacent receive beam (e.g., first adjacent receive beam 804 or second adjacent receive beam 806), a parent receive beam 810 of the current receive beam 802, an adjacent parent receive beam (e.g., first adjacent parent receive beam 808 or second adjacent parent receive beam 812), an adjacent child receive beam (e.g., first adjacent child receive beam 814, second adjacent child receive beam 816, third adjacent child receive beam 820, fourth adjacent child receive beam 822), or a child receive beam 818 of the current receive beam 802.

For example, the current receive beam 802 may correspond to the refined beam 604 used by the first UE 104a of FIG. 6. An adjacent receive beam of FIG. 8 may correspond to another refined beam used by the first UE 104a, and a parent receive beam of FIG. 8 may correspond to the broad beam 602 used by the first UE 104a. The child beam of FIG. 8 may correspond to one of the narrower beams 606 used by the first UE 104a.

Based on locally stored experience buffer information and/or information received from the network entity 150, the neural network may provide the UE with an indication of how to transition from the current receive beam 802 to a better receive beam based on the information without identifying a particular beam. For example, the neural network may indicate a neighborhood of candidate beams (e.g., a child beam or an adjacent beam). Here, the neural network may also provide the UE with a general beam direction that the UE should transition to.

FIG. 9 is a call-flow diagram illustrating example communications 900 between a UE 104 and a base station 102 and network entity 150.

At a first action 902, the UE 104 and the base station 102 may perform a beam sweep. Here, the UE 104 may select one or more receive beams for receiving SSBs transmitted via multiple transmit beam directions within an SSBS. The UE 104 measure the power of the received SSBs and may store a current state of the UE 104 during the beam sweep. Current state information may include power measurement information (e.g., the power different between a current measured power and a previously measured power using a same receive beam, and/or a differential of a current and previous measurement of a same SSB) and environmental information of the UE 104.

At a second action 904, the UE 104 may determine an optimum receive beam and make that receive beam its current receive beam for receiving transmissions from the base station 102. At a third action 906, the UE 104 may also store (e.g., in a local experience buffer) its experience and UE environmental information associated with the beam sweep of the first action 902.

At a fourth action 908, the UE 104 may transmit data stored in the experience buffer to the network entity 150. For example, the UE 104 may transmit the information stored in the tables described in reference to FIGS. 5 and 7 above. The UE 104 may also request additional information stored by the network entity 150. The additional information may include experience data provided by other UEs in the same region or area. The UE 104 may use this additional information to train its neural network to better predict a receive beam transition for a future beam sweep. Because the additional information is obtained from other UEs in the same area, the neural network may be better prepared to provide a recommended receive beam transition to the UE 104 if it is trained on this data.

At a fifth action 910, the UE may prepare to perform another beam sweep with the base station 102 by selecting another receive beam(s) for receiving another set of SSB from another SSBS. Here, the UE may input data from its experience buffer into the neural network and optionally input the additional information provided by the network entity 150. Based on this information, the neural network may provide the UE with a recommended beam transition from the current receive beam to another receive beam for receiving SSBs. For example, if the UE has moved or changed orientation since the last SSBS, the UE may determine that a new receive beam direction would provide better reception of the next set of SSBs.

At a sixth action 912, the UE 104 and the base station 102 may perform another beam sweep wherein the UE 104 may use one or more new receive beams selected based on the neural network transition information.

FIG. 10 is a flowchart 1000 of a method of wireless communication. The method may be performed by a UE (e.g., the UE 104; the apparatus 1102). At 1002, the UE may select one or more receive beams for receiving synchronization signal blocks (SSBs) of a first synchronization signal burst set (SSBS). For example, 1002 may be performed by a selecting component 1140. Here, the UE may select one or more beams for receiving SSBs transmitted by a base station during a beam sweep procedure.

At 1004, the UE may optionally select the first receive beam for receiving the first SSB based on information previously stored in the local storage and associated with the first receive beam, wherein the information comprises a previously measured power of the first SSB. For example, 1004 may be performed by the selecting component 1140. Here, the UE may select a receive beam for receiving an SSB in a beam sweep based on a previous measurement of the same SSB using the same beam. For example, a transmit beam used by the base station 102 in a beam sweep may be assigned an SSB for current and future beam sweeps. Here, if the base station 102 transmits two SSBs in an SSBS (e.g., SSB_1 and SSB_2), then, the base station 102 may perform the beam sweeping by periodically transmitting SSB_1 using a first transmit beam, and SSB_2 using a second transmit beam. The UE may select a receive beam for a corresponding SSB based on a previous measurement of the same SSB that was previously transmitted using the same transmit beam. Information relating to the previous measurement, as well as environmental information about the UE during the previous measurement may be stored locally by the UE in an experience buffer.

At 1006, the UE may measure a power of a first SSB of the first SSBS received via a first receive beam of the one or more receive beams. For example, 1006 may be performed by a measuring component 1142. Here, the UE may measure a plurality of SSBs transmitted by the base station during an SSBS. The UE may use one or more receive beams selected by the selecting component 1140 to receive the SSBs. In some examples, the UE may measure an RSRP of each received SSB including the first SSB.

At 1008, the UE may optionally transmit, to a network entity, the measured power of the first SSB and at least one parameter associated with receiving the first SSB. For example, 1004 may be performed by a transmitting component 1144. Here, the UE may transmit data (e.g., UE state, receive beam used to receive an SSB, an RSRP of the received SSB, etc.) associated with a previous beam sweep to a network entity. In some examples, the data may be transmitted via a sidelink communication link between the UE and edge server.

At 1010, the UE may optionally receive, from the network entity, receive beam information aggregated from other UEs, wherein the receive beam information comprises one or more of a receive beam direction, an identifier of a second SSB, a time the second SSB was previously received by another UE, a previously measured power of the second SSB performed by the other UE, a location of the other UE when a power of the second SSB was measured, or an orientation of the UE when the power of the second SSB was measured. For example, 1004 may be performed by a receiving component 1150. Here, the UE may transmit a request for information to the edge server and the server may transmit information to the UE. In some examples, the UE may provide the server with information about the UE state, and the edge server transmit only information related to the UE state. For example, if the UE provides the server with an indication of one or more of its location, speed, orientation, etc., the server may send it information it has aggregated from other UEs that correspond to the provided UE state information.

At 1012, the store, in a local storage, the measured power of the first SSB and at least one parameter associated with receiving the first SSB. For example, 1012 may be performed by a storing component 1146. For example, the UE may store UE state information (e.g., a UE state, receive beam used to receive an SSB, an RSRP of the received SSB, etc.) during a beam sweep. The UE may also store information about the states of other UEs received from the network entity.

At 1014, the UE may optionally store, in the local storage, an indication of the first receive beam used to receive the first SSB. For example, 1014 may be performed by the storing component 1146. Here, the UE may store information collected while performing a beam sweep, including SSBs measured, the receive beams used to receive the SSBs, the measurements of the SSBs, and environmental aspects of the UE during the beam sweep.

At 1016, the UE may optionally input, to a neural network, an indication of the measured power of the first SSB and the at least one parameter associated with receiving the first SSB. For example, 1016 may be performed by an inputting component 1148. Here, the UE may input locally stored information (including, in some examples, information received from the edge server) into its neural network. The UE may convert the information into a vector form prior to input.

At 1018, the UE may select, based on neural network feedback, a second receive beam for receiving a second SSB of a second SSBS. For example, 1018 may be performed by the selecting component 1140. Here, the UE may select another receive beam for receiving an SSB during another beam sweep. In certain aspects, the neural network feedback is based at least in part on the indication of the measured power of the first SSB and the at least one parameter, and wherein the neural network feedback comprises an indication of a receive beam direction relative to the first receive beam.

In certain aspects, the measured power of the first SSB is at least one of a reference signal received power (RSRP), a reference signal received quality (RSRQ), or a signal to interference plus noise ratio (SINR).

In certain aspects, the at least one parameter associated with receiving the first SSB comprises: an identifier of the first SSB, a identifier of the first receive beam, an indication of a time the first SSB was received, or an indication of a UE state.

In certain aspects, the UE state includes one or more of: a location of the UE or an orientation of the UE.

In certain aspects, the selecting one or more receive beams comprises selecting the one or more receive beams from a codebook.

In certain aspects, storing the indication of the measured power of the first SSB and at least one parameter further comprises storing another measured power of one or more additional SSBs received by one or more other receive beams from the codebook.

Figure 11:
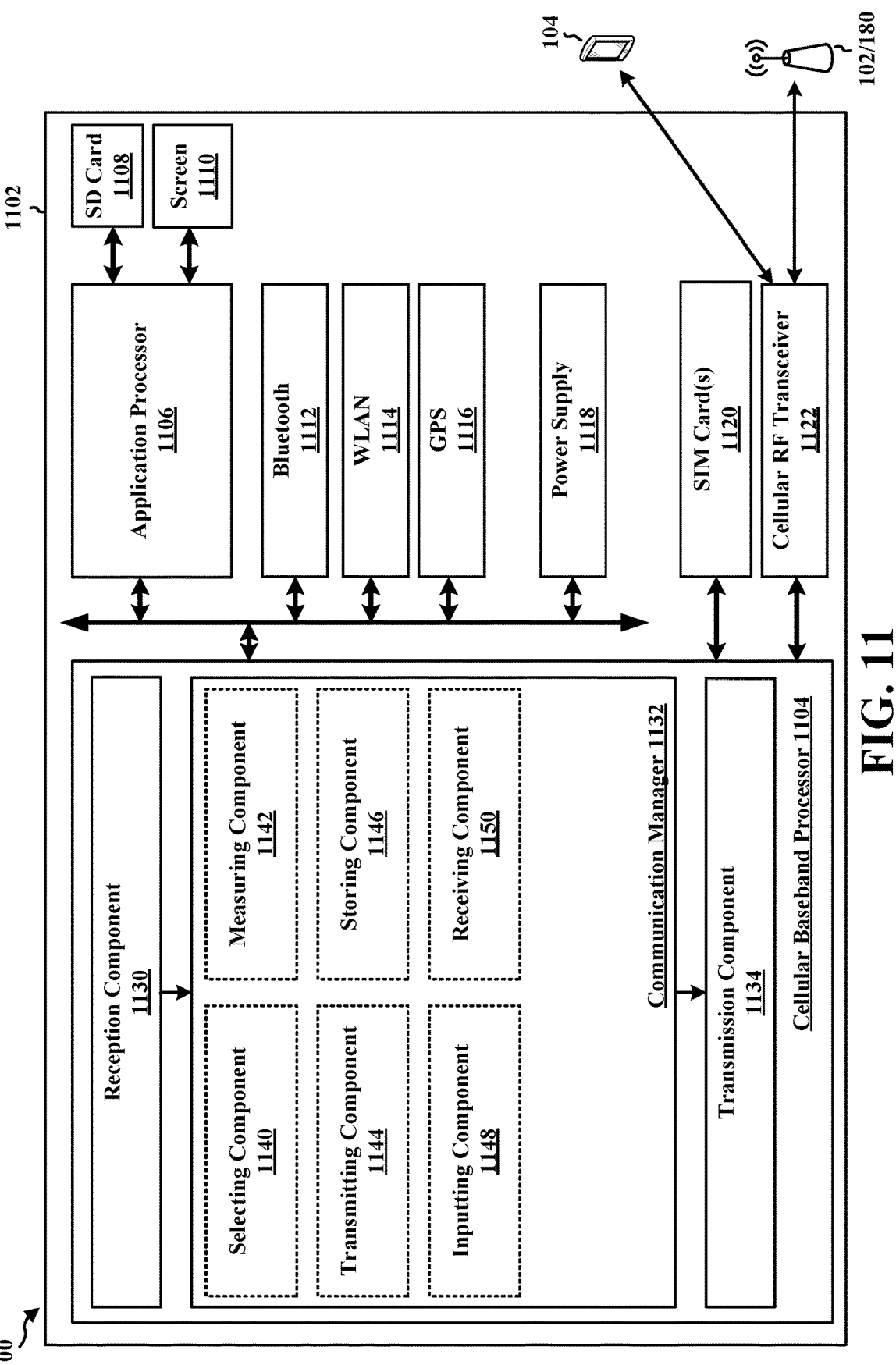
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 104 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see UE 104 of FIG. 3) and include the aforediscussed additional modules of the apparatus 1102. In various examples, the apparatus 1102 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 1132 includes a selecting component 1140 that is configured to select one or more receive beams for receiving synchronization signal blocks (SSBs) of a first synchronization signal burst set (SSBS); select the first receive beam for receiving the first SSB based on information previously stored in the local storage and associated with the first receive beam, wherein the information comprises a previously measured power of the first SSB; and select, based on neural network feedback, a second receive beam for receiving a second SSB of a second SSBS; e.g., as described in connection with 1002, 1004, and 1018 of FIG. 10.

The communication manager 1132 further includes a measuring component 1142 configured to measure a power of a first SSB of the first SSBS received via a first receive beam of the one or more receive beams, e.g., as described in connection with 1006.

The communication manager 1132 further includes a transmitting component 1144 configured to transmit, to a network entity, the measured power of the first SSB and at least one parameter associated with receiving the first SSB, e.g., as described in connection with 1008.

The communication manager 1132 further includes a storing component 1146 configured to store, in a local storage, the measured power of the first SSB and at least one parameter associated with receiving the first SSB; and store, in the local storage, an indication of the first receive beam used to receive the first SSB; e.g., as described in connection with 1012 and 1014.

The communication manager 1132 further includes an inputting component 1148 configured to input, to a neural network, an indication of the measured power of the first SSB and the at least one parameter associated with receiving the first SSB, e.g., as described in connection with 1016.

The apparatus may include additional components that perform each of the blocks of the algorithms and actions in FIGS. 9 and 10. As such, each block may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for selecting one or more receive beams for receiving synchronization signal blocks (SSBs) of a first synchronization signal burst set (SSBS); means for selecting the first receive beam for receiving the first SSB based on information previously stored in the local storage and associated with the first receive beam, wherein the information comprises a previously measured power of the first SSB; means for measuring a power of a first SSB of the first SSBS received via a first receive beam of the one or more receive beams; means for transmitting, to a network entity, the measured power of the first SSB and at least one parameter associated with receiving the first SSB; means for receiving, from the network entity, receive beam information aggregated from other UEs, wherein the receive beam information comprises one or more of a receive beam direction, an identifier of a second SSB, a time the second SSB was previously received by another UE, a previously measured power of the second SSB performed by the other UE, a location of the other UE when a power of the second SSB was measured, or an orientation of the UE when the power of the second SSB was measured; means for storing, in a local storage, the measured power of the first SSB and at least one parameter associated with receiving the first SSB; means for storing, in the local storage, an indication of the first receive beam used to receive the first SSB; means for inputting, to a neural network, an indication of the measured power of the first SSB and the at least one parameter associated with receiving the first SSB; and means for selecting, based on neural network feedback, a second receive beam for receiving a second SSB of a second SSBS.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 12 is a flowchart 1200 of a method of wireless communication. The method may be performed by a network entity such as an access point (AP), an edge server (e.g., the network entity 150; the apparatus 1302), or another UE. At 1202, the network entity may receive, from a first user equipment (UE) of a plurality of UEs, a first receive beam data identifying first receive beam and a power measurement of a synchronization signal block (SSB) received via the first receive beam. For example, 1202 may be performed by a receiving component 1340.

At 1204, the UE may transmit, to the first UE, a second receive beam data identifying a second receive beam and a second power measurement, wherein the second receive beam data is a portion of aggregated beam data received by the network entity from the plurality of UEs and stored at the network entity. For example, 1204 may be performed by a transmitting component 1342.

In certain aspects, the first receive beam data further comprises a tag indicating environmental conditions of the first UE at a time the first UE performed the power measurement of the SSB.

In certain aspects, the environmental conditions comprise at least one of a direction the first UE is traveling, a speed of the first UE, a location of the first UE, or an orientation of the first UE.

Figure 13:
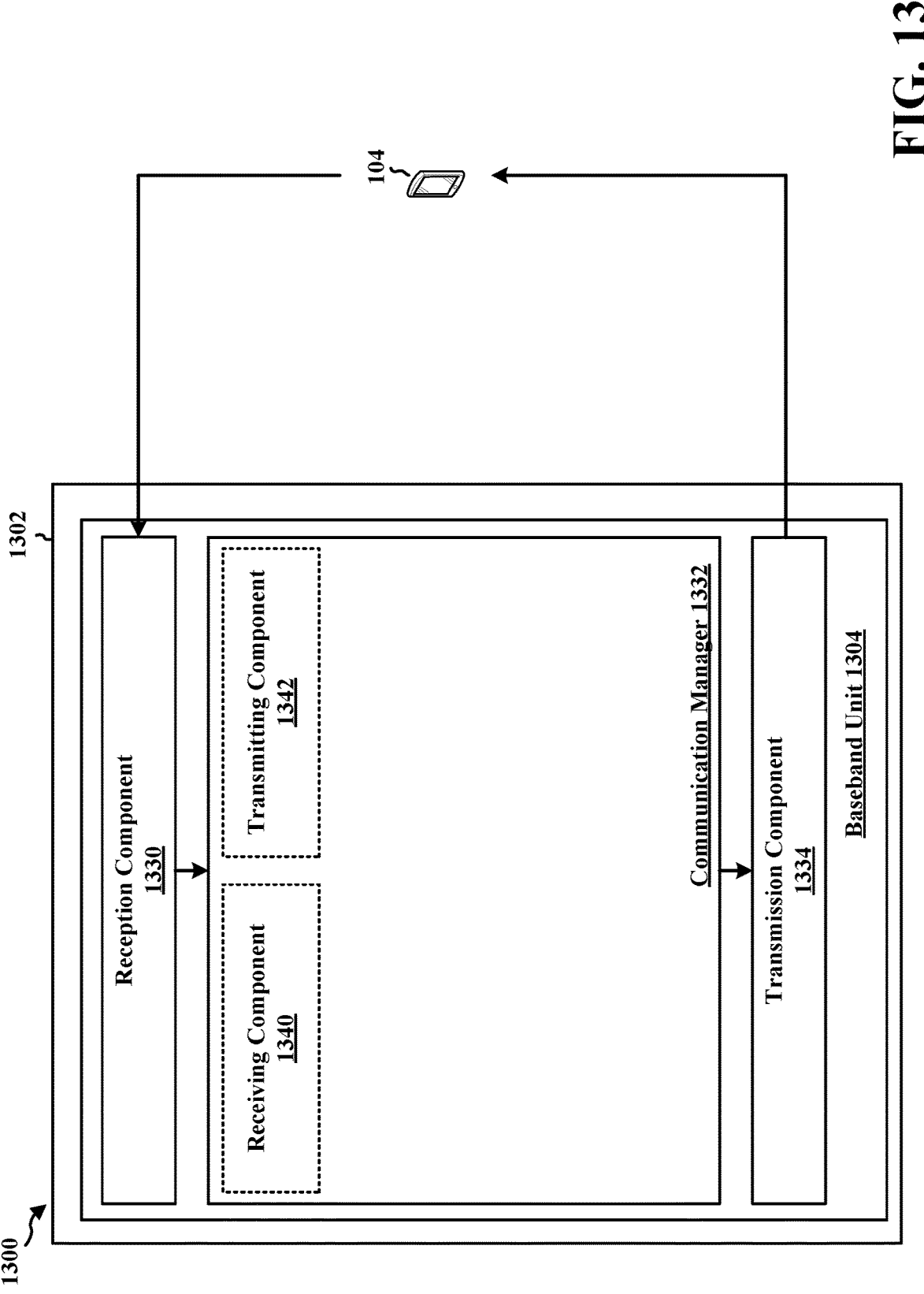
FIG. 13 is a diagram illustrating another example of a hardware implementation for another example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 102/180 and may include the memory 376 and/or at least one of the TX processor 316, the RX processor 370, and the controller/processor 375. In various examples, the apparatus 1302 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 1332 includes a receiving component 1340 configured to receive, from a first user equipment (UE) of a plurality of UEs, a first receive beam data identifying first receive beam and a power measurement of a synchronization signal block (SSB) received via the first receive beam, e.g., as described in connection with 1202.

The communication manager 1332 further includes a transmitting component 1342 configured to transmit, to the first UE, a second receive beam data identifying a second receive beam and a second power measurement, wherein the second receive beam data is a portion of aggregated beam data received by the network entity from the plurality of UEs and stored at the network entity, e.g., as described in connection with 1204.

The apparatus may include additional components that perform each of the blocks of the algorithm and actions in FIGS. 9 and 12. As such, each block an action may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving, from a first user equipment (UE) of a plurality of UEs, a first receive beam data identifying first receive beam and a power measurement of a synchronization signal block (SSB) received via the first receive beam; and means for transmitting, to the first UE, a second receive beam data identifying a second receive beam and a second power measurement, wherein the second receive beam data is a portion of aggregated beam data received by the network entity from the plurality of UEs and stored at the network entity. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Clause 1. A method of beam management at a user equipment (UE), comprising: selecting one or more receive beams for receiving synchronization signal blocks (SSBs) of a first synchronization signal burst set (SSBS); measuring a power of a first SSB of the first SSBS received via a first receive beam of the one or more receive beams; and storing, in a local storage, the measured power of the first SSB and at least one parameter associated with receiving the first SSB.

Clause 2. The method of clause 1, wherein the measured power of the first SSB is at least one of a reference signal received power (RSRP), a reference signal received quality (RSRQ), or a signal to interference plus noise ratio (SINR).

Clause 3. The method of any of clauses 1 and 2, wherein the at least one parameter associated with receiving the first SSB comprises: an identifier of the first SSB, a identifier of the first receive beam, an indication of a time the first SSB was received, or an indication of a UE state.

Clause 4. The method of clause 3, wherein the UE state includes one or more of: a location of the UE or an orientation of the UE.

Clause 5. The method of any of clauses 1-4, wherein the selecting one or more receive beams comprises selecting the one or more receive beams from a codebook.

Clause 6. The method of clause 5, wherein storing the indication of the measured power of the first SSB and at least one parameter further comprises storing another measured power of one or more additional SSBs received by one or more other receive beams from the codebook.

Clause 7. The method of any of clauses 1-6, wherein storing the indication of the measured power of the first SSB and at least one parameter associated with receiving the first SSB further comprises: storing, in the local storage, an indication of the first receive beam used to receive the first SSB.

Clause 8. The method of clause 7, wherein selecting one or more receive beams for receiving SSBs of the first SSBS further comprises: selecting the first receive beam for receiving the first SSB based on information previously stored in the local storage and associated with the first receive beam, wherein the information comprises a previously measured power of the first SSB.

Clause 9. The method of any of clauses 1-8, further comprising: inputting, to a neural network, an indication of the measured power of the first SSB and the at least one parameter associated with receiving the first SSB; and selecting, based on neural network feedback, a second receive beam for receiving a second SSB of a second SSBS.

Clause 10. The method of clause 9, wherein the neural network feedback is based at least in part on the indication of the measured power of the first SSB and the at least one parameter, and wherein the neural network feedback comprises an indication of a receive beam direction relative to the first receive beam.

Clause 11. The method of any of clauses 1-10, further comprising: transmitting, to a network entity, the measured power of the first SSB and at least one parameter associated with receiving the first SSB; and receiving, from the network entity, receive beam information aggregated from other UEs, wherein the receive beam information comprises one or more of a receive beam direction, an identifier of a second SSB, a time the second SSB was previously received by another UE, a previously measured power of the second SSB performed by the other UE, a location of the other UE when a power of the second SSB was measured, or an orientation of the UE when the power of the second SSB was measured.

Clause 12. A method of beam management at a network entity, comprising: receiving, from a first user equipment (UE) of a plurality of UEs, a first receive beam data identifying first receive beam and a power measurement of a synchronization signal block (SSB) received via the first receive beam; and transmitting, to the first UE, a second receive beam data identifying a second receive beam and a second power measurement, wherein the second receive beam data is a portion of aggregated beam data received by the network entity from the plurality of UEs and stored at the network entity.

Clause 13. The method of clause 12, wherein the first receive beam data further comprises a tag indicating environmental conditions of the first UE at a time the first UE performed the power measurement of the SSB.

Clause 14. The method of clause 13, wherein the environmental conditions comprise at least one of a direction the first UE is traveling, a speed of the first UE, a location of the first UE, or an orientation of the first UE.

Clause 15. A user equipment (UE) comprising: one or more memories, individually or in combination, having instructions; and one or more processors, individually or in combination, configured to execute the instructions and cause the UE to perform the method of any of claims 1-11.

Clause 16. A network entity comprising: one or more memories, individually or in combination, having instructions; and one or more processors, individually or in combination, configured to execute the instructions and cause the network entity to perform the method of any of claims 12-14.

Clause 17. A user equipment (UE) comprising: one or more means for performing the method of any of claims 1-11.

Clause 18. A network entity comprising: one or more means for performing the method of any of claims 12-14.

Clause 19. A non-transitory computer-readable storage medium having instructions stored thereon for performing the method of any of claims 1-11 for wireless communication by a user equipment (UE).

Clause 20. A non-transitory computer-readable storage medium having instructions stored thereon for performing the method of any of claims 12-14 for wireless communication by a network entity.

What is claimed is:

1. A method of beam management at a user equipment (UE), comprising:
   selecting one or more receive beams for receiving synchronization signal blocks (SSBs) of a first synchronization signal burst set (SSBS);
   measuring a power of a first SSB of the first SSBS received via a first receive beam of the one or more receive beams;
   transmitting, to a network entity, the measured power of the first SSB and at least one parameter associated with receiving the first SSB;
   receiving, from the network entity, receive beam information aggregated from other UEs; and
   storing, in a local storage, the measured power of the first SSB and at least one parameter associated with receiving the first SSB.

2. The method of claim 1, wherein the measured power of the first SSB is at least one of a reference signal received power (RSRP), a reference signal received quality (RSRQ), or a signal to interference plus noise ratio (SINR).

3. The method of claim 1, wherein the at least one parameter associated with receiving the first SSB comprises: an identifier of the first SSB, a identifier of the first receive beam, an indication of a time the first SSB was received, or an indication of a UE state.

4. The method of claim 3, wherein the UE state includes one or more of: a location of the UE or an orientation of the UE.

5. The method of claim 1, wherein the selecting one or more receive beams comprises selecting the one or more receive beams from a codebook.

6. The method of claim 5, wherein storing the measured power of the first SSB and at least one parameter further comprises storing another measured power of one or more additional SSBs received by one or more other receive beams from the codebook.

7. The method of claim 1, wherein storing the measured power of the first SSB and at least one parameter associated with receiving the first SSB further comprises:
   storing, in the local storage, an indication of the first receive beam used to receive the first SSB.

8. The method of claim 7, wherein selecting one or more receive beams for receiving SSBs of the first SSBS further comprises:
   selecting the first receive beam for receiving the first SSB based on information previously stored in the local storage and associated with the first receive beam, wherein the information comprises a previously measured power of the first SSB.

9. The method of claim 1, further comprising:
   inputting, to a neural network, an indication of the measured power of the first SSB and the at least one parameter associated with receiving the first SSB; and
   selecting, based on neural network feedback, a second receive beam for receiving a second SSB of a second SSBS.

10. The method of claim 9, wherein the neural network feedback is based at least in part on the indication of the measured power of the first SSB and the at least one parameter, and wherein the neural network feedback comprises an indication of a receive beam direction relative to the first receive beam.

11. The method of claim 1,
   wherein the receive beam information comprises one or more of a receive beam direction, an identifier of a second SSB, a time the second SSB was previously received by another UE, a previously measured power of the second SSB performed by the other UE, a location of the other UE when a power of the second SSB was measured, or an orientation of the UE when the power of the second SSB was measured.

12. A method of beam management at a network entity, comprising:
   receiving, from a first user equipment (UE) of a plurality of UEs, a first receive beam data identifying first receive beam and a power measurement of a synchronization signal block (SSB) received via the first receive beam; and
   transmitting, to the first UE, a second receive beam data identifying a second receive beam and a second power measurement, wherein the second receive beam data is a portion of aggregated beam data received by the network entity from the plurality of UEs and stored at the network entity.

13. The method of claim 12, wherein the first receive beam data further comprises a tag indicating environmental conditions of the first UE at a time the first UE performed the power measurement of the SSB.

14. The method of claim 13, wherein the environmental conditions comprise at least one of a direction the first UE is traveling, a speed of the first UE, a location of the first UE, or an orientation of the first UE.

15. An apparatus for wireless communication at a user equipment (UE), comprising:
   one or more memories, individually or in combination, having instructions; and one or more processors, individually or in combination, configured to execute the instructions and cause the apparatus to:

measure a power of a first SSB of a first synchronization signal burst set (SSBS) received via a first receive beam of the one or more receive beams;

transmit, to a network entity, the measured power of the first SSB and at least one parameter associated with receiving the first SSB;

receive, from the network entity, receive beam information aggregated from other UEs; and store, in a local storage, the measured power of the first SSB and at least one parameter associated with receiving the first SSB.

16. The apparatus of claim 15, wherein the measured power of the first SSB is at least one of a reference signal received power (RSRP), a reference signal received quality (RSRQ), or a signal to interference plus noise ratio (SINR).

17. The apparatus of claim 15, wherein the at least one parameter associated with receiving the first SSB comprises: an identifier of the first SSB, a identifier of the first receive beam, an indication of a time the first SSB was received, or an indication of a UE state.

18. The apparatus of claim 17, wherein the UE state includes one or more of: a location of the UE or an orientation of the UE.

19. The apparatus of claim 15, wherein the one or more receive beams are selected from a codebook.

20. The apparatus of claim 19, wherein the one or more processors are further configured to:

store an indication of another measured power of one or more additional SSBs received by one or more other receive beams from the codebook.

21. The apparatus of claim 15, wherein the one or more processors are further configured to:

store, in the local storage, an indication of the first receive beam used to receive the first SSB.

22. The apparatus of claim 21, wherein the first receive beam for receiving the first SSB is selected based on information previously stored in the local storage and associated with the first receive beam, wherein the information comprises a previously measured power of the first SSB.

23. The apparatus of claim 15, wherein the one or more processors are further configured to:

input, to a neural network, an indication of the measured power of the first SSB and the at least one parameter associated with receiving the first SSB; and select, based on neural network feedback, a second receive beam for receiving a second SSB of a second SSBS.

24. The apparatus of claim 23, wherein the neural network feedback is based at least in part on the indication of the measured power of the first SSB and the at least one parameter, and wherein the neural network feedback comprises an indication of a receive beam direction relative to the first receive beam.

25. The apparatus of claim 15, wherein the receive beam information comprises one or more of a receive beam direction, an identifier of a second SSB, a time the second SSB was previously received by another UE, a previously measured power of the second SSB performed by the other UE, a location of the other UE when a power of the second SSB was measured, or an orientation of the UE when the power of the second SSB was measured.

26. An apparatus for wireless communication at a network entity, comprising:

one or more memories, individually or in combination, having instructions; and one or more processors, individually or in combination, configured to execute the instructions and cause the apparatus to:

receive, from a first user equipment (UE) of a plurality of UEs, a first receive beam data identifying first receive beam and a power measurement of a synchronization signal block (SSB) received via the first receive beam; and transmit, to the first UE, a second receive beam data identifying a second receive beam and a second power measurement, wherein the second receive beam data is a portion of aggregated beam data received by the network entity from the plurality of UEs and stored at the network entity.

27. The apparatus of claim 26, wherein the first receive beam data further comprises a tag indicating environmental conditions of the first UE at a time the first UE performed the power measurement of the SSB.

28. The apparatus of claim 27, wherein the environmental conditions comprise at least one of a direction the first UE is traveling, a speed of the first UE, a location of the first UE, or an orientation of the first UE.

* * * * *